WIDE BAND TRAVELING WAVE TUBE AMPLIFIER APPARATUS

Original Filed July 29, 1953 3 Sheets-Sheet 1

INVENTOR.
JOHN T. MENDEL
BY
Paul M. Klein Jr.
ATTORNEY

INVENTOR.
JOHN T. MENDEL
BY
Paul M. Klein Jr.
ATTORNEY

Sept. 28, 1965 J. T. MENDEL 3,209,272

WIDE BAND TRAVELING WAVE TUBE AMPLIFIER APPARATUS

Original Filed July 29, 1953 3 Sheets-Sheet 3

INVENTOR.
JOHN T. MENDEL
BY
Paul M. Klein Jr.
ATTORNEY 3,209,272

WIDE BAND TRAVELING WAVE TUBE AMPLIFIER APPARATUS

John T. Mendel, Palos Verdes Estates, Calif., assignor, by mesne assignments, to the United States of America as represented by the Secretary of the Navy Application July 8, 1958, Ser. No. 747,322, now Patent No. 2,999,181, dated Sept. 5, 1961, which is a division of application Ser. No. 371,125, July 29, 1953, now Patent No. 2,849,545, dated Aug. 26, 1958. Divided and this application Mar. 13, 1961, Ser. No. 95,455
2 Claims. (Cl. 330—10)

This application constitutes a division of my co-pending application, Serial No. 747,322, filed July 8, 1958, now Patent No. 2,999,181, which is a division of my application Serial No. 371,125, filed July 29, 1953, now Patent No. 2,849,545.

This invention relates to wide band traveling wave tube amplifier apparatus. More particularly it relates to a traveling wave tube amplifier associated with a demodulator circuit and to a cascade arrangement of traveling wave tube amplifiers.

The broad purposes of the present invention are to provide means and methods for amplifying signals occupying a frequency spectrum, whose bandwidth is of the order of a thousand megacycles, by from 30 to 60 db; to provide such means using few and relatively simple parts; to provide means for amplifying such spectra which are substantially linear throughout the band and which are capable of handling the power levels necessary for effective utilization. Other ancillary objects are to provide means for modulating bandwidths of the order of 1000 megacycles on carrier frequencies of several times the highest frequency included in bands to be amplified and of detecting the modulating components from the resulting products; to provide a type of traveling wave tube structure capable of effecting such modulation; and to provide a cascade arrangement of traveling wave tubes wherein amplification can be effected up to the limits of output power which such tubes can handle effectively.

Considered broadly the invention utilizes a traveling wave tube of the general type which has become conventional within recent years, and which comprises an electron gun adapted to project a concentrated beam of electrons through a wave guide, including means for delaying waves propagated therealong, mounted in such manner that the electron beam from the gun is projected axially thereof. Collecting means are also provided for receiving the electron beam. Means external to the device may be provided for focusing the beam of electrons or electrostatic focusing means may be used within the device itself. As is now well understood, when waves are propagated along the wave guide and the velocities of the electrons within the beam are so adjusted as to be substantially equal to the velocity of the delayed wave propagated along the guide, there is an interaction between the waves and the electron stream whereby amplification occurs and an amplified signal can be withdrawn either from the output end of the wave guide, the beam, as it appears at the collector, or both. The wave guide should, of course, be terminated as nearly as possible in its characteristic impedance in order to prevent reflections which would result in standing, rather than traveling waves within the guide.

In accordance with the present invention this conventional structure is modified by the addition of a grid in the electron gun which is spaced from the cathode by a distance which is of the order of one-thousandth of an inch both the emitting surface of the cathode and the grid thus introduced being planar in order to permit spacings of this order of magnitude to be actually realized. With spacings of this order of magnitude the electron beam can be efficiently density-modulated and the original signals applied between cathode and grid. A local oscillator is provided for developing a substantially constant frequency which is several times the highest component frequency in the original signals. Theoretically the lower limit of the frequency to be supplied by the local oscillator is twice that of the signal frequency component; in practice apparatus and adjustment requirements are less rigid if the local oscillator frequency employed be from four to five times that of the highest signal frequency component.

The amplitude of the waves in the output of a traveling wave tube is a function of both beam current and the amplitude of the input signals. As a result of this relationship the output wave produced, either at the collector or at the output end of the wave guide, comprises a local oscillator frequency amplitude-modulated by the input signals, i.e., the local oscillator frequency itself plus side bands of the oscillator frequency plus and minus the component frequencies of the input signals. In effect this has converted the original one-thousand megacycle band to a band two thousand megacycles wide, but has shifted the center frequency of the band from say, five hundred megacycles to at least two thousand megacycles and preferably somewhere between four and five thousand megacycles or even higher. Assuming the local oscillator frequency as five thousand megacycles, the band now occupied by the modulated signal will be from four to six megacycles. No serious difficulty is experienced in obtaining a pass-band of this width with a traveling wave tube, although a 2:1 ratio of minimum to maximum frequency is quite difficult to achieve and the greater band width which would be required at the theoretical limit is, if possible at all, even more so.

The modulated signal at the output of the tube can be detected or demodulated by several different devices. Crystal detection can be used, although this involves the loss of considerable gain. A better method of demodulation involves the use of a triode of the type now available for ultra-high frequency or microwave applications, operated as a plate circuit detector with the grid grounded. With this arrangement amplifier gains in the neighborhood of 36 db can be realized.

If further amplification is desired the modulated signal can be fed to the wave guide of a second traveling wave tube and amplified therein in the manner usual in such tubes and thereafter detected. By the use of such an additional amplifier in cascade over-all amplification in the neighborhood of 60 db can be obtained, using the modes of demodulation already described.

For a more complete understanding of the invention reference is made to the detailed description of certain preferred embodiments of the invention which follows, illustrated by the accompanying drawings, wherein.

Figure 1:
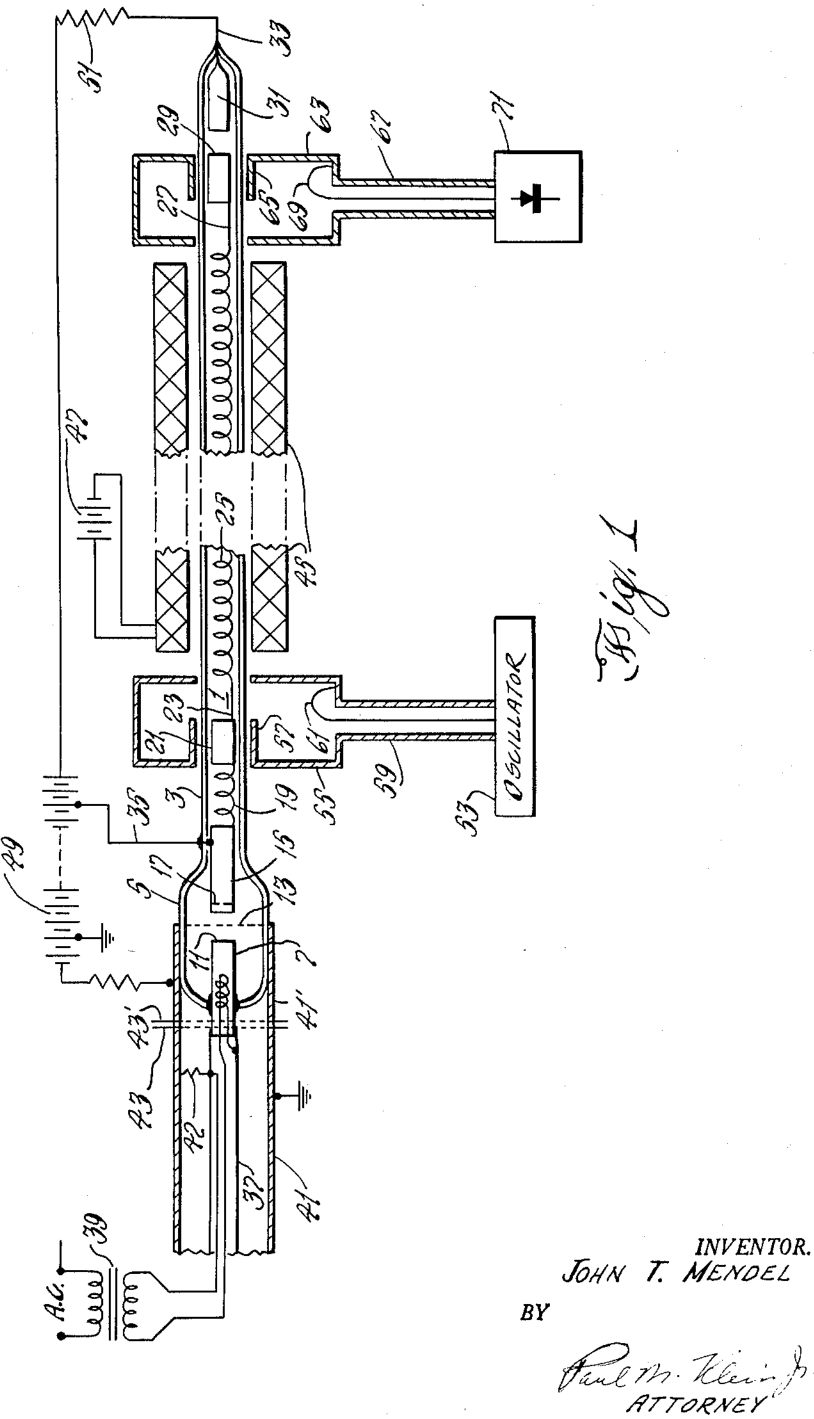
FIG. 1 is a semi-schematic sectional view, not to scale, of a traveling wave tube and associated circuits used in accordance with one form of the invention.

In the drawing of FIG. 1 the reference character 1 indicates generally a traveling wave tube which, with certain exceptions which will be specifically pointed out, is substantially of conventional form. The tube comprises an evacuated glass envelope having an elongated tubular body 3 and a bulbous base 5. Sealed through the end of the base is a cathode cylinder 7 surrounding a heater coil 9. The cathode has a planar emitting surface 11. In very close proximity to the surface 11 is a grid 13 of very fine closely spaced wires, and for best operation the spacing between grid and emitter should be of the order of one-thousandth of an inch, so that the transit time of electrons between the emitter and the grid is short in comparison with the period of the highest frequency signal comprised in the band to be amplified. Structures of somewhat similar character have been successfully made with spacings between grid and emitting surface of between 0.0005 and 0.001 inch; in the practice of this invention the closer the spacing the better. The grid support is brought out in a seal through the sides of the bulb 5 as shown.

An anode 15, having an outer diameter which is preferably a sliding fit within the tubular portion 3 of the envelope, faces the grid and the emitting surface of the cathode, and forms with these elements an electron gun for developing a concentrated beam of electrons directed along the length of the tube; cathode, grid, and anode being, of course, axially alined. The anode may contain one or more apertured diaphragms 17 as components of an electron lens structure which concentrates and focuses the beam, but as various arrangements of electrodes within an electron gun which will act in this manner are well known the exact structure of the gun is not an essential feature of the invention except as regards the spacing of the grid and the emitting surface. Preferably, however, the elements of the gun, with the possible exception of the cathode, should be made of non-magnetic materials—copper, molybdenum, or tungsten rather than nickel—in order to prevent the setting up of magnetic fields which would interfere with the best focusing of the electron beam produced by the gun. In the cathode cylinder, however, the use of a magnetic material may actually be an aid to focusing since it tends to concentrate the lines of forcing of the focusing field which is used in this area, whereas the use of magnetic materials in other portions of the gun would tend to misguide the focusing field.

In the particular tube shown the anode is connected by a short coil 19 to a short tubular electrode 21, also fitting within the tubular body 3 of the device. The electrode 21 connects through a short straight wire 23 to a wave-delaying wave guide 25. Various types of such combination delay lines and wave guides have been devised and are suitable for use in connection with this invention. A simple helical coil such as is shown, fitting slidably within a tube is easy to construct and is as satisfactory for the purpose as any type known to the inventor at the present time, and hence is the form illustrated and preferred in practice. In one actual tube the helix is constructed of 0.020 inch tungsten wire, wound 20 turns to the inch. The method of design of such wave-delaying guides is now well known, and the size and pitch which are employed depend in some degree upon the other construction and operating parameters of the particular tube used.

The helix 25 terminates, through a second short straight connection 27, with a cylinder 29, and facing the last mentioned cylinder is a collector electrode 31 having a connection 33 sealed out through the end of the tube 3. The anode, helix and intermediate structure just described are supplied with operating potentials through a lead 35 connecting directly to the anode 15 and brought out through a seal in the wall of the tube 3.

The size of the bulb 5 is so chosen that it fits within the end of a conventional standard coaxial line. A connecting fitting (not shown) is provided so that the cathode cylinder 7 forms, in effect, a continuation of the central conductor 37 for such a line. Connections for supplying current to the heater 9 from a transformer 39 are brought through the center conductor 37. Actual details of the transformer 39 and the heater connection will be described later. The outer tubular conductor 41 of the tube is connected to the central conductor 37 by one or more miniature resistors 42, to provide a matching termination. Because in this case it is desirable to impose a bias potential between the cathode and the grid 13, a blocking condenser is provided. This comprises mating flanges 43, 43′ flaring outwardly from the outer conductor 41 and a continuation thereof, 41′. A thin film of dielectric is sufficient to insulate against the low voltage (one or two volts) used for the bias. The grid 13 is grounded so far as high frequency potentials are concerned, by being abutted against the end of the conductor 41′, and the D.C. bias is applied between conductors 41 and 41′.

The mechanical details of the structure utilized to effect these connections, as well as to support the tube 1 and its accompanying equipment, are not shown since they are details which may vary widely in accordance with the ideas of the particular designer, and hence only a schematic showing of this portion of the over-all structure is here presented.

The helical delaying wave guide 25 is surrounded by a magnetic focusing coil 45, connected with a direct current source indicated as a battery 47. A high voltage source 49, here also indicated as a battery, supplies a voltage between cathode and anode which may be of the order of a thousand volts. This same potential source supplies a slightly higher potential to the collector 31. Since, however, with the particular connection shown in this first figure, power is not withdrawn from the collector circuit, it is advisable to include, in the connection 33 from the collector to the voltage source 49, means for introducing losses which tend to damp out the radio frequency components. Such means are indicated as comprising a resistor 51, and in practice they may be merely the use of a "lossy" insulation in a collector lead, or the latter may be carried through blocks of carbon or other material of similar loss characteristics to damp out the componenets mentioned without introducing any material resistance in the direct current circuit.

Means are provided for exciting the input end of the helix 25 from a local oscillator 53 with a suitable carrier frequency, and for withdrawing amplified signals from the output or collector end of the tube. Various means are available for feeding power into and withdrawing power from the delay-line wave guides of tubes of this character; in the instance shown the means used for coupling the input and output circuits are similar. The input coupler comprises an annular cavity resonator 55 having a re-entrant tubular portion 57 through which the tube 3 passes. There is a gap between the re-entrant tube 57 and the opposite wall of the cavity, and the cavity is so positioned that the straight portion 23 of the wave-guide structure lies within this gap and acts as an antenna, which picks up the energy from the oscillator and transfers it to the wave guide. The parts are so proportioned that there is a substantial impedance match between the oscillator, the cavity, and the wave guide, so that energy is transferred into the wave guide to substantially the optimum extent. This energy is propagated efficiently along the helix 25. Any material propagation of the wave in the opposite direction and consequent loss of power or even effective shorting of the input power to ground is prevented by successive impedance mismatches. The change in impedance from the antenna portion 23 to the tubular portion 21 is abrupt instead of gradual as is the transition of the antenna into the helix 25. This abrupt transition is followed by a similarly abrupt transition between the tubular section 21 and the coil 19 and a third abrupt transition occurs between coil 19 and the tubular anode section 15 to which the supply voltage is connected. Effectively, therefore, the portion of the structure between the antenna and the anode acts as a low-pass filter which permits the direct voltage from the source 49 to be applied to the wave guide without involving large loss of power in the opposite direction.

The cavity resonator 55 is fed from an oscillator 53 by a coaxial line 59 which terminates in a coupling loop 61 in well known manner, the dimensions of the loop and resonator being such as to obtain a satisfactory match in impedance between the line and the cavity so that the energy from the oscillator 53 is fed efficiently into the wave guide.

The output circuit is, as stated above, substantially a duplicate of the input circuit. The cavity resonator 63 is provided with a re-entrant tubular portion 65 which surrounds the terminal cylinder 29 of the wave guide. The gap between the re-entrant tube 65 and the opposite wall of the resonator surrounds the output antenna 27, and, as is the case for the input connection, the transition between this antenna and the helix 25 is made gradual so as to minimize reflections. Similarly an impedance match between the antenna and the cavity minimizes reflections in spite of the drastic mismatch between the antenna and the tubular terminal portion 29.

Coupling from the cavity 63 to an output coaxial line 67 is through a loop 69 as in the case of the input cavity. The line 67 is shown in the drawing in purely schematic fashion, and a detector 71, which it feeds, is shown in block form in this figure, since the characteristics of the line depend in some degree of the form of detection used. The details of one specific form which is satisfactory for the purpose will be described in detail hereinafter. Similarly, the oscillator 53 is shown in block form since there are several which will serve the purpose, i.e., which will oscillate at frequencies in the general neighborhood of 5 kilomegacycles and which are sufficiently stable if proper precautions are taken. Among such oscillators may be mentioned high frequency triodes, klystrons, and traveling wave oscillators. The actual type used is immaterial to this invention.

Figure 2:
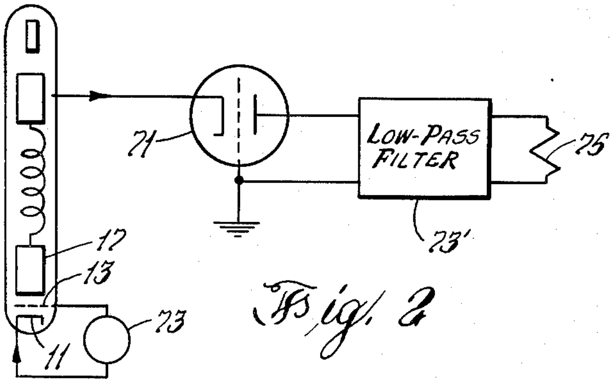
FIG. 2 is a diagram, in highly simplified form, showing the over-all circuit utilized in the invention as illustrated in FIG. 1.

The over-all circuit in which the tube and its appurtenances as thus far described are used is indicated in FIG. 2. The source of signals to be simplified is symbolized by a generator 73, connecting between the cathode 11 and grid 13. Signals from the source 73 modulate the beam developed by the electron gun, which is projected coaxially of the wave-delaying wave guide. Simultaneously the wave guide carries a traveling wave which is supplied by the local oscillator, and the accelerating potential applied to the anode 17 of the electron gun is such that the velocities of the electrons in the beam are substantially the same as the velocity of propagation of the waves along the guide, which is materially less than their velocity along a guide having solid walls or the velocity of electric waves in free space.

It is now well understood that under such conditions the field within the wave guide reacts upon the beam and the beam also reacts upon the field so that there is an amplification produced which increases exponentially along the tube. This amplification, however, depends not only upon the amplitude of the oscillations fed to the input end of the wave guide but also upon the intensity of the beam current, and it can be shown that this latter relationship is such as to result in linear amplification at the output end of the tube, both of the instantaneous value of the beam current (i.e., bunching of electrons therein) and of the wave intensity along the guide as it appears at the output antenna. This amplification can, in tubes which can be achieved in practice, be made of the order of 30 db, corresponding to a power ratio in the neighborhood of 1000:1. The power withdrawn at the output end of the tube, in the form of a modulated wave, can then be demodulated by suitable means (shown in FIG. 2 as a grounded-grid detector 71) and the carrier frequency and upper sideband components removed by a substantially conventional low-pass filter 73', leaving the original low-pass signal available in useful form across an output load resistor 75. The very great advantage of this procedure arises from the fact that the traveling wave tube will handle bandwidths of the order required, provided the band is in the frequency range which has already been mentioned.

It will be apparent, however, since the procedure used involves double sideband modulation that the bandwidth required within the tube itself is double that of the original signal. This is not a serious problem provided the frequency supplied by the local oscillator is sufficiently high. In order to separate the carrier frequency from the frequency in the original signal it is clear that the carrier must be at least twice as high in frequency as the maximum frequency in the signal to be amplified. If a frequency in the neighborhood of this minimum were chosen the tube would have to amplify a bandwidth of from 1000 megacycles to 3000 megacycles, or a bandwith ratio of 3:1. If such a bandwidth ratio were possible it would certainly be very difficult to achieve; even if the local oscillator frequency were taken as 3 kilomegacycles, the carrier plus its sidebands would occupy the band extending from 2 to 4 kilomegacycles, or a bandwidth ratio of 2:1. To realize even such a ratio is difficult, but if the carrier frequency be made in the range of from 4 to 5 kilomegacycles (kmc.) resulting in bandwidth ratios of from 1⅔:1 to 1½:1, such ratios are easily within the capabilities of traveling wave tubes as presently constructed. Raising the carrier frequency increases somewhat the problems involved in detection, but it does not increase these problems unduly. The choice of the carrier frequency is therefore an engineering compromise. In the present state of knowledge frequencies in the range mentioned are preferred, but this range could be extended in either direction by advances in the construction of the traveling wave tube itself without departing from the spirit of the invention.

Those skilled in the art will recognize that the actual usefulness of the equipment as thus far described depends upon the ability to supply the original signals to modulate the electron gun without introducing prohibitive insertion losses, and similarly to withdraw and demodulate the amplified signal without similar losses. Means for accomplishing these necessary ends will next be considered.

In view of the varied nature of the sources of signals which the apparatus of this invention may be required to handle it is unprofitable to discuss the impedance characteristic of the source or the method of coupling it to the input coaxial line. Means for matching the impedance of any such source to a coaxial line are well known in the art. The primary problem on the input end of the device is therefore that of coupling such a line to the cathode of the tube and supplying the heater current for the cathode without introducing impedance irregularities or other sources of loss or distortion. The construction of the gun as illustrated in FIG. 1 makes it clear that the grid 13 can readily be connected to the outer conductor of the line. Furthermore the cathode cylinder 7 can be sealed through the bulbous base of the tube and can be made of such diameter as to permit the inner conductor 37 to slide over it, using a conventional form of connector to make the contact. One end of the heater coil 9 is connected to the cathode cylinder, and the other is connected to a central pin 76 which projects axially from the external end of the cylinder.

Figure 3:
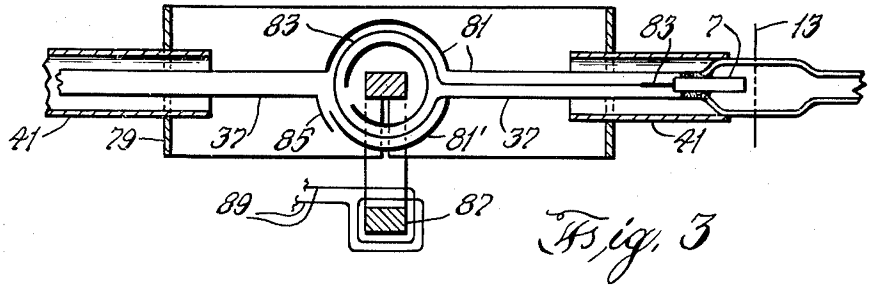
FIG. 3 is a sectional view in plan of a heater transformer as utilized in connection with the tube illustrated in FIG. 1.
Figure 4:
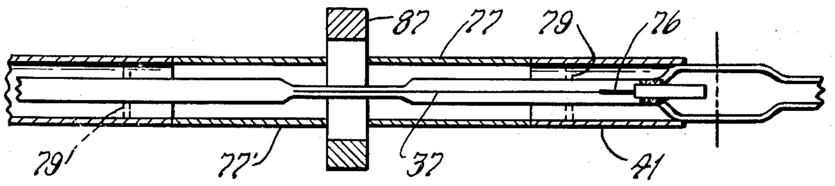
FIG. 4 is an elevational sectional view of the heater transformer and signal input line shown in FIG. 4.

This arrangement is illustrated in FIGS. 3 and 4, which also show the construction of the cathode-heater transformer and the manner in which it is introduced into the line. As shown in these figures the outer conductor 41 of the coaxial line merges with two metal plates 77, 77', the conductor 41 projecting a short distance between these plates, which are supported at their ends and separated by transverse closures 79 through which the outer conductor projects. The inner conductor 37 projects some distance within the plates beyond the end of the conductor 41, the plates forming, with the inner conductor, a "slab line" having substantially the the same characteristic impedance as the coaxial line itself. The input end of the slab line is substantially identical with its output end as thus far described and the parts are identified by the same reference character. Substantially in the middle of the slab line the central conductor 37 divides into two branches 81, 81', both of which are smaller in diameter than the conductor 37 and each of which has substantially twice the characteristic impedance of the central conductor. Hence when connected, as shown, in parallel they create no mismatch. The conductors 37, 81 and 81' are all tubular. A coil 83 of fine wire (in one instance, ten turns) is wound within the conductors 81, 81'. One end of this coil is connected to the conductor 37, the other end is carried out through it and connects with the pin 76 which forms the inner terminal of the heater coil 9. The branch conductor 81 is continuous between the two conductors 37 which extend into the input and output coaxial lines. There is a small gap between conductor 81' and one of the leads 37. This gap is closed, so far as the high frequency signals are concerned, by a capacitive coupling comprising a thin sheet of metal foil 85 connected to the conductor 37 but insulated from conductor 81' by a thin sheet of dielectric. The two conductors 81 and 81' do not, therefore, constitute a short circuited turn so far as the low frequency heater voltages are concerned.

A transformer core 87 of conventional construction extends through apertures in the upper and lower plates 77, passing through the conductors 81, 81' and their enclosed coil and so linking the latter with a conventional primary winding 89, wound on the external leg of the core. This has been found a very effective way of coupling the heater input to the traveling wave tube with minimum insertion loss.

Figure 5:
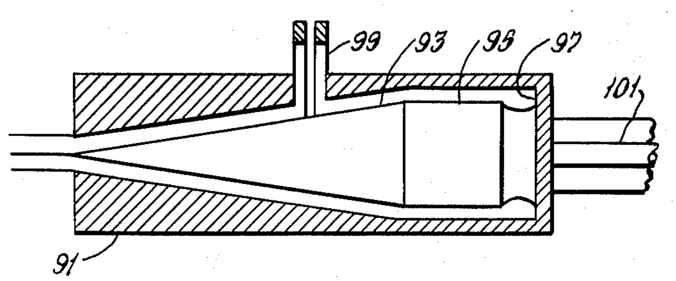
FIG. 5 is a cross-sectional diagram of the input line to one form of detector.

One means of connecting the detector in the output circuit is illustrated in FIG. 5. This type of equipment is suitable for use with a grounded-grid triode, such as the one designated as "Western Electric 416–A." In order to accommodate the necessary wave band the input impedance to this tube must be low. It is convenient to ues standard 50 ohm coaxial cable as the output of cavity resonator 63. This is connected into a tapered section of line comprising an outer shell 91 and an inner core 93, which abuts the base 95 of the tube, connecting to the cathode. The grid of the tube abuts the closed end 97 of the outer conductor. Heater connections are brought in to the conical core through a high impedance stub 99. A low impedance, output coaxial line 101 feeds a substantially conventional low-pass filter and output load as shown in FIG. 2.

Figure 6:
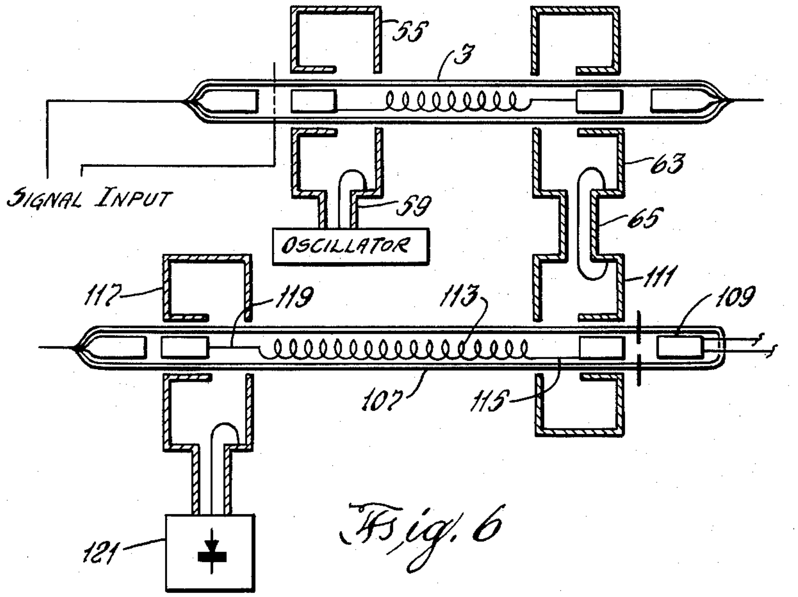
FIG. 6 is a diagram showing the method of connecting two traveling wave tubes in cascade in order to obtain additional gain.

Additional gain over that afforded by the tube arrangement of FIG. 1 can be achieved by the arrangement shown schematically in FIG. 6. In this arrangement two tubes of the traveling wave type are employed, and since the first tube is identical with that already described in detail it is shown only schematically, the circuit details being omitted. Such features as are specifically identified carry the same reference characters as in FIG. 1.

The output cavity 63, however, is connected by the coaxial line 65 to the input cavity of a second traveling wave tube 107 which may be identical with a tube 113 but which is shown without a grid for its electron gun 109 since the beam of the second tube is not modulated. The input cavity 111 feeds the amplified modulated wave from the line 65 to the wave-delaying line 113 through the antenna 115 and amplification of this wave is accomplished in the usual manner. Either form of detection which has been described above may be used; for the purpose of illustration the output there is shown a cavity resonator 117 coupling to the output antenna 119 and feeding a detector 121.

The use of a second tube in cascade in this manner greatly increases the gain. Over-all gain of the cascaded circuits may be made of the order of 60 db or more as contrasted with the approximately 36 db available in the single tube in accordance with present techniques.

It should be evident that in the construction of the traveling wave tube utilized for the purpose of this invention all the precautions for reducing noise levels which have been found advisable in such tubes should be employed. Since, as a general rule, the noise factor is proportional to band-width and the band which may be amplified by the methods herein described is approximately double the width of those which can be accommodated by conventional means, the signal-to-noise ratio is inherently lower than with more conventional apparatus. Noise figures of 15 db are attainable with equipment constructed in accordance with practices now known, and since there has been a steady improvement in the signal-to-noise ratios of traveling wave tubes since their first development continued improvement is to be expected, with corresponding over-all improvement of the results obtainable from this invention.

The particular value of the present invention arises from the fact that it achieves its gain-bandwidth product by the use of compact and relatively simple apparatus and that because of the small number of tubes employed the chances of its failure due to the failure of any single element are greatly reduced.

It is to be noted that in the description of the apparatus and of its utility the wave-band has been described as "of the order of magnitude" (or "of the order") of 1 kilomegacycle, and for the purpose of description a 1 megacycle bandwidth has been assumed. "Order" or "order of magnitude" are here used in their mathematical sense as embracing at least one complete order of magnitude. Even this is not intended as a definite limitation. It is recognized that improved techniques in building low-noise types of traveling wave tubes and in detecting waves of still higher frequencies may extend the utility of the invention into still higher frequency ranges. Improvement in signal-to-noise ratio may similarly indicate the use of the invention in amplifying wavebands which can now be more effectively handled by conventional means. "Order of magnitude," as used in the description and in the preamble of the claims is therefore not intended to be limiting, but merely a guide to the field of usefulness to which the invention is presently best adapted. It is also recognized that many modifications as to detail are possible and the specific descriptions herein given are not intended as limitations on the scope of the invention except as they are expressed in the following claims.

What is claimed is:

1. An amplifier of signals occupying a frequency band-width of the order of 1000 megacycles comprising a traveling wave tube including an electron gun comprising a cathode, a grid, and an apertured anode, a wave-delaying wave guide positioned to receive axially a beam of electrons from said electron gun and a collector for receiving said beam; means for coupling a source of signals to be amplified to said cathode and grid to density-modulate said beam, an oscillator adapted to generate electric waves of a frequency several times as high as the highest signal to be amplified; means for coupling said oscillator to said wave guide to produce traveling waves therein, an output circuit coupled to said traveling wave tube, a second traveling wave tube comprising an electron gun, a wave-delaying wave guide and a collector, coupling means between said output circuit and said last mentioned wave guide, an output circuit coupled to said second traveling wave tube and demodulating means connected in said output circuit.

2. An amplifier for signals occupying a frequency band-width of the order of 1000 megacycles comprising a traveling wave tube having an electron gun including a cathode, a grid in immediate proximity to said cathode and an apertured anode for developing a density-modulated beam of electrons, a wave-delaying wave guide positioned to receive said beam substantially axially thereof, impedance matching means coupled to the end of said wave guide remote from said electron gun for preventing material reflection of waves transmitted thereby, a collector of electrons from said beam and an output circuit for amplified signals developed by said tube; means for biasing said anode and wave guide to accelerate electrons from said cathode to produce said beam; means for coupling a source of signals to be amplified to said cathode and grid to modulate said electron beam; an oscillator adapted to generate electric waves of a substantially constant frequency several times as great as the highest frequency signal to be amplified; means for coupling said oscillator to said wave guide to excite therein traveling waves; a demodulator connected in said output circuit; and a low-pass filter connected to said demodulator adapted to select from the output thereof frequencies lower than that generated by said oscillator, said demodulator comprising a triode, a ground connection to the grid of said triode and means for so biasing the input circuit of said triode as to effect anode-circuit detection thereby.

References Cited by the Examiner

UNITED STATES PATENTS

| | | | |
|---|---|---|---|
| 2,300,052 | 10/42 | Lindenblad | 330—43 |
| 2,611,832 | 9/52 | Lapostolle | 330—10 X |
| 2,676,246 | 4/54 | Rinia | 330—43 X |
| 2,689,887 | 9/54 | Doehler | 330—43 |
| 2,691,078 | 10/54 | Gluyas | 330—186 X |
| 2,726,332 | 12/55 | Arditi et al. | 330—43 X |
| 2,733,305 | 1/56 | Diemer | 330—43 |

ROY LAKE, *Primary Examiner.*

NATHAN KAUFMAN, *Examiner.*